United States Patent
Richter

(10) Patent No.: US 7,614,595 B2
(45) Date of Patent: Nov. 10, 2009

(54) MOBILE TELEPHONE/PDA HOLDER MECHANISM WITH ADJUSTABLE ENGAGEMENT SIDE JAWS

(76) Inventor: Harald Richter, Höhenstrasse 22, 75331 Engelbrand (DE)

(*) Notice: Subject to any disclaimer, the term of this patent is extended or adjusted under 35 U.S.C. 154(b) by 916 days.

(21) Appl. No.: 11/133,064

(22) Filed: May 19, 2005

(65) Prior Publication Data
US 2006/0145040 A1    Jul. 6, 2006

(30) Foreign Application Priority Data
Jan. 3, 2005    (EP) ................................ 05000011

(51) Int. Cl.
*A47B 91/00* (2006.01)
(52) U.S. Cl. .............. 248/346.01; 248/309.1; 248/316.2; 379/446
(58) Field of Classification Search ........... 224/570, 224/929; 248/346.01, 316.4, 309.1, 316.2; 379/446, 445
See application file for complete search history.

(56) References Cited

U.S. PATENT DOCUMENTS

| | | | |
|---|---|---|---|
| 3,602,058 A | * | 8/1971 | Beddoe ................. 74/434 |
| 3,916,716 A | * | 11/1975 | Rix et al. ............... 74/461 |
| 5,555,302 A | * | 9/1996 | Wang .................. 379/446 |
| 5,788,202 A | * | 8/1998 | Richter ............... 248/316.4 |
| 5,836,563 A | * | 11/1998 | Hsin-Yung ........... 248/316.4 |
| 7,407,143 B1 | * | 8/2008 | Chen ................. 248/309.1 |
| 2007/0262223 A1 | * | 11/2007 | Wang et al. ......... 248/346.07 |

* cited by examiner

*Primary Examiner*—Amy J Sterling
(74) *Attorney, Agent, or Firm*—Klaus J. Bach

(57) ABSTRACT

In a mobile telephone/PDA holder (mechanism) having a hollow body with clamping jaws supported therein by guide legs which are disposed in the hollow body so as to be slidable in unison toward, and away from, one another under control of an operating mechanism including a coupling wheel rotatably supported in the hollow body and being coupled to the guide legs, and locking elements biased into engagement with the locking wheel, the locking wheel is provided with a circumferential layer of a resilient material and the locking elements are disposed adjacent the locking wheel and have saw-tooth like projection firmly engaging the resilient material layer and the locking wheel for preventing rotation thereof in one direction but permitting its rotation in the opposite direction and a release key connected to the locking element and extending from the hollow body for releasing the locking wheel.

2 Claims, 2 Drawing Sheets

MOBILE TELEPHONE/PDA HOLDER MECHANISM WITH ADJUSTABLE ENGAGEMENT SIDE JAWS

BACKGROUND OF THE INVENTION

The invention relates to a mechanism for the adjustment, the locking and the releasing of the adjustable engagement jaws of a mobile telephone or PDA holder.

Such a mechanism is known from German patent DE 195 42 720. This patent discloses a mobile telephone/PDA holder with a base body on which the mobile telephone, the PDA or a similar apparatus such as a mobile navigation apparatus can be placed and firmly engaged by two clamping jaws which are movable in synchronism toward, and away from, one another by a mechanism disposed in the base body. The mechanism provides for the synchronous opening and closing of the jaws and the automatic locking of the jaws in their closed positions.

In the known holder, the two engagement jaws are interconnected for the synchronous movement by a coupling mechanism which includes a rotatably supported control disc with diametrically opposite elongated radial openings. In each opening, a pin is received which projects from a guide leg of one or, respectively, the other of the engagement jaws providing for the synchronous movement of the engagement jaws as they are coupled by the control disc in whose elongated openings the pins of the engagement jaw legs are received.

A displacement of the jaws toward, or away from, each other therefore always occurs synchronously and uniformly, because the two clamping jaws are coupled with each other by way of the pins and the wheel receiving the pins in its radial elongated openings. A compression spring arrangement between the base body and the jaws biases the jaws into their opening positions.

The known mechanism further includes a gear which is rotatably connected to the wheel of the coupling mechanism which is engaged by a locking claw. The locking claw is provided on a slide member whose free end is a release key. The locking claw projects from the base body and is biased into engagement with the gear. The locking claw therefore forms with the gear a ratchet mechanism. By actuation of the release key, the locking claw is removed from the gear so that the two clamping jaws are moved synchronously apart from each other to their outermost opening positions. After the insertion of the apparatus into the holder the jaws are manually moved together whereby the gear slides over the engagement claws which are biased to its engagement position because the teeth of the gear are so shaped that they make such a ratchet movement possible upon closing of the clamping jaws but prevent movement of the gear in the opening direction of the jaws. The clamping gears are therefore only released when the release key is pressed in and, as a result, the locking claw is moved out of its engagement position with the gear.

Since the teeth of the known apparatus must have a certain width in the circumferential direction of the gear the jaws are closed in a stepwise fashion in that the closing of the clamping jaws progresses with the ratcheting of each tooth of the gear over the ratchet claw. Accordingly, the subsequent locking position of the clamping jaws which are increasingly closer are spaced by a certain distance from one another without the possibility of setting any intermediate positions. Since, consequently, the distance between the clamping jaws can be changed only in steps the clamping jaws must be provided at their engagement surfaces with a relatively thick resilient backing in order to provide for secure engagement of an apparatus disposed between the clamping jaws. In addition, during the closing of the known mechanism, an undesirable ratcheting noise is generated.

U.S. Pat. No. 5,788,202 additionally discloses another mechanism which, in place of a gear, uses a friction wheel which, at its circumference, is provided with a rubber layer and includes two oppositely arranged friction wedges which cooperate to frictionally engage the friction wheel therebetween. However, it has been found in practice that this arrangement is subject to certain problems which render the arrangement ineffective under certain circumstances: At large temperature changes as they occur with the use of the holder in vehicles, it has been found that the clamping jaws were sometimes released when the vehicle was exposed to the sun so that they were moved by the springs to their open end positions so that the apparatus was not reliably held in its engaged position.

It is the object of the present invention to improve the mechanism of mobile telephone or PDA holders with adjustable clamping jaws in such a way that the closing movement of the clamping jaws and the locking of the clamping jaws in the respective engagement positions is achieved without noise and also in a stepless and reliable fashion.

SUMMARY OF THE INVENTION

In a mobile telephone/PDA holder (mechanism) having a hollow body with clamping jaws supported therein by guide legs which are disposed in the hollow body so as to be slidable in unison toward, and away from, one another under control of an operating mechanism including a coupling wheel rotatably supported in the hollow body and being coupled to the guide legs, and locking elements biased into engagement with the locking wheel, the locking wheel is provided with a circumferential layer of a resilient material and the locking elements are disposed adjacent the locking wheel and have saw-tooth like projection firmly engaging the resilient material layer and the locking wheel for preventing rotation thereof in one direction but permitting its rotation in the opposite direction and a release key connected to the locking element and extending from the hollow body for releasing the locking wheel.

This mechanism is noiseless and operates reliably. Instead of an engagement claw, it includes a segmented arresting member with at least one barbed hook but permits rotation of the wheel in the closing direction and provides for a bite-like engagement with the elastic circumferential structure of the elastic element. The arrangement works reliably and without generating any noise and, especially, is not affected by temperature changes.

Below, the invention will be described in greater detail on the basis of the accompanying drawings.

DESCRIPTION OF A PREFERRED EMBODIMENT

Figure 1:
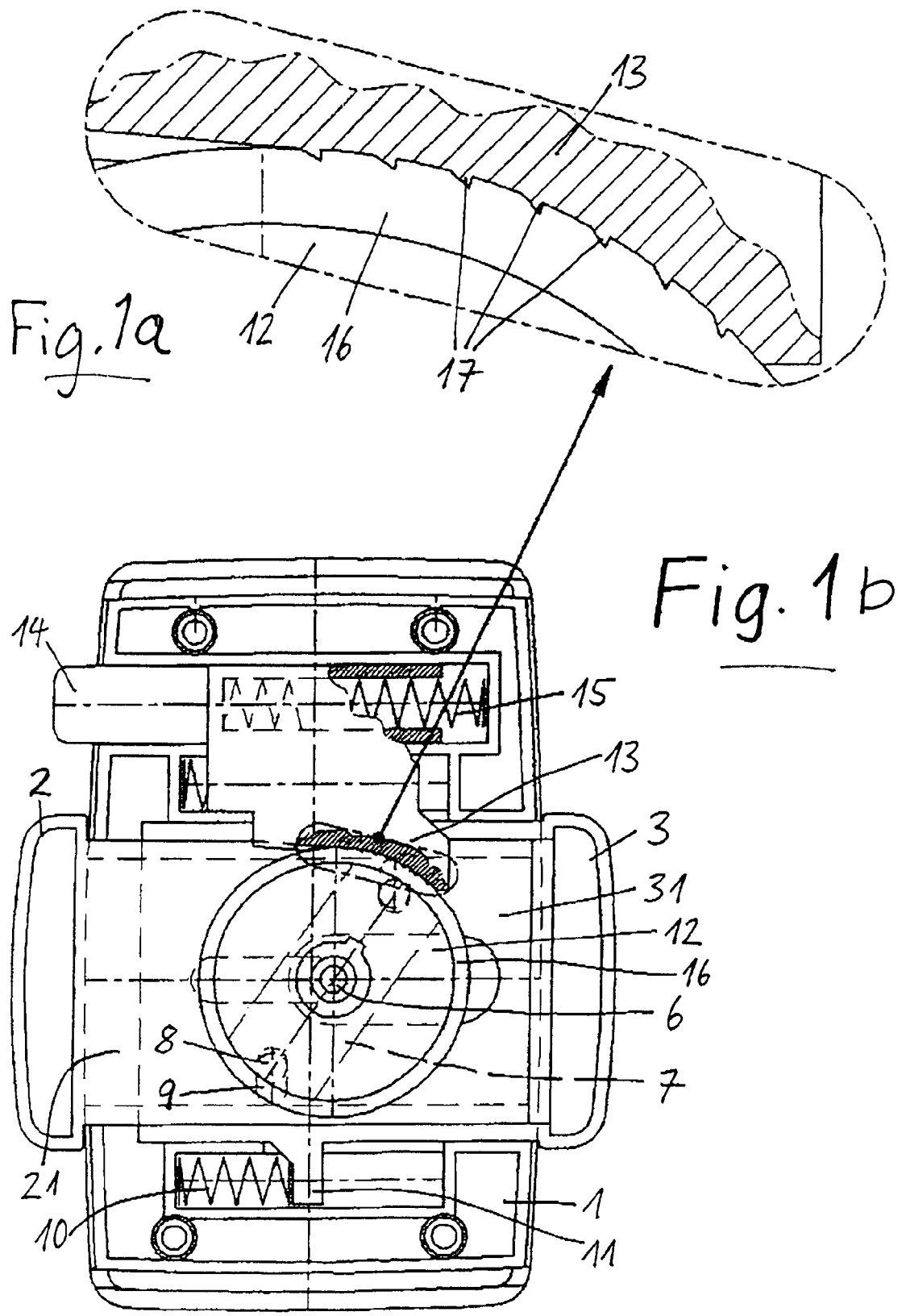
FIG. 1b is a bottom view of a mobile telephone or PDA holder with the bottom wall removed so that the mechanism according to the invention is visible.
FIG. 1a shows the detail encircled in FIG. 1b.
Figure 2:
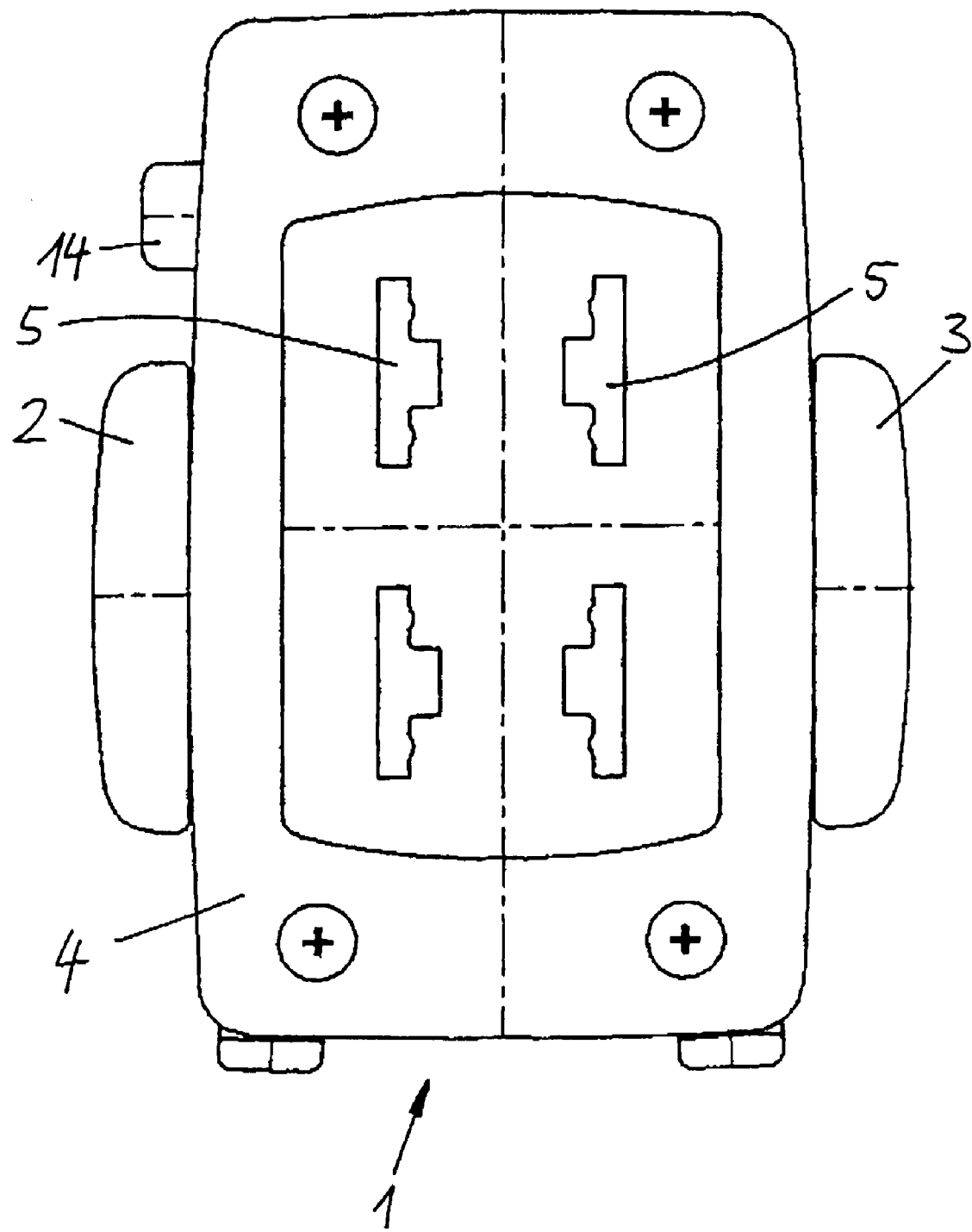
FIG. 2 shows the bottom of the telephone or PDA holder with the bottom wall mounted thereon.

The mobile telephone/PDA holder as such has the basic shape as it is shown in the drawings and described in the introductory part of the description with regard to DE 195 42 720 C1 and U.S. Pat. No. 5,788,202 and will therefore not described in greater detail. Rather, reference is made to these patents of which U.S. Pat. No. 5,788,202 is incorporated herein by reference.

The mechanism consists—in a short summary—of the guide legs 21, 31 which extend from the two clamping jaws 2 and 3, respectively, and which are movable into, and out of, the base body 1. The guide legs 21, 31 are in engagement with a coupling mechanism in the form of an element 7 rotatable about an axis 6 extending normal to the plane of the guide legs and have diametrically opposite pins 8 (or openings), which each have respective openings 9 (or a respective pins) of the clamping jaw guide legs (21, 31). In this way, the two clamping jaws are so coupled with each other that they are movable toward, or away from, each other in a synchronous and uniform manner. Two compression springs 10 arranged in the base body 1 are supported on one side on the base body and with their opposite end on a support structure 11 at the respective guide leg 21 and, respectively, 31 of the clamping jaws 2 and 3 and bias them into opening direction.

A locking wheel 12 is connected to the rotatable element 7 for rotation therewith and a locking shoe 13 cooperates with the locking wheel 7 to permit locking thereof. The locking shoe 13 is connected to a slide member which includes a release key 14 and the slide member is biased by a compression spring 15 so as to move the locking shoe toward the locking wheel 12 for engagement therewith. At its circumference, the locking wheel 12 is provided with an annular rubber layer 16. The layer wheel 12 may also be reduced to a wheel segment, which extends over an arc as needed for the operation of the arrangement.

FIG. 1a shows the area of the circumference of the locking shoe 13 which is engagement with the locking wheel 12 in an enlarged fashion. It is apparent therefrom that the locking shoe 13 cooperates with a locking wheel 12 over a certain circumference thereof and is provided with a number of small teeth 17 which are pressed into the circumferential surface of the rubber layer 16 of the locking wheel 12. These teeth have a flat saw tooth profile and therefore act like barbed hooks. They prevent therefore rotation of the locking wheel 12, as shown in FIG. 1b, in counterclockwise direction but permit rotation of the locking wheel 12 in clockwise direction, wherein the rubber layer slides past the teeth 17.

When the release key 14 projecting from the base body is pressed the locking shoe 13 is lifted off the locking wheel 12 so that the locking wheel is freely movable (in clockwise direction) and the springs 10 move the engagement jaws into the fully open position. After placement of the respective apparatus into the holder the two clamping jaws 2 and 3 are moved toward each other in order to engage them with the side surfaces of the apparatus. At this point, the locking wheel 12 as shown in FIG. 1b rotates clockwise and its rubber layer 16 slides over the teeth 17 until the engagement position of the clamping jaws 2 and 3 on the apparatus is reached. In this position, the locking wheel 12 is locked by the teeth 17 of the locking shoe 13 whose teeth 13 are now pressed into the rubber layer 16 to prevent its counter clockwise rotation whereby the clamping jaws 2 and 3 cannot move in opening direction.

Obviously, at least one tooth 17 must be present but a plurality of teeth is advantageous so that a sufficiently large locking force can be generated without causing damage to the rubber layer 16 and there is only little resistance to a rotation of the locking wheel 12 in the passing direction 1 that is in a direction opposite to the locking direction. Of course, instead of a rubber layer a suitable sufficiently elastic circumferential layer of any suitable material may be provided on the locking wheel (12).

What is claimed is:

1. A mobile telephone/PDA holder mechanism, comprising a hollow base body for supporting a telephone/PDA holder apparatus, said mechanism being disposed in the base body (1) and comprising two clamping jaws (2, 3) supported on the base body (1) so as to be movable synchronously and uniformly away from, and toward, each other, guide legs (21, 31) projecting from said clamping jaws (2, 3) and being slidably guided in said base body (1), a coupling element (7) rotatably supported in said base body (1) and being coupled at opposite sides with the guide legs (21, 31), via a pin-slot connection, a compression spring arrangement biasing the clamping jaws (2, 3) in an opening direction, a locking wheel (12) connected to the coupling element (7) for rotation therewith and a locking element (13) arranged adjacent the locking wheel (12) and being spring biased into contact with the locking wheel (12) so as to prevent rotation of the locking wheel (12) in a jaw-opening direction, but permitting rotation of the locking wheel (12) in a jaw-closing direction, and a release key (14) for disengaging the locking element (13) from the locking wheel (12) so as to permit the rotation of the locking wheel (12) in a clamping jaw opening direction, said locking wheel (12) being provided with an elastically deformable circumferential surface area (16) and the locking element (13) being a locking shoe with a plurality of teeth (17), which are arranged in a circumferentially spaced relationship on the locking shoe (17) and have a flat saw-tooth profile and, for engagement with the locking wheel (12), are pressed into the resilient circumferential surface of the locking wheel (12).

2. A mobile telephone/PDA holder mechanism according to claim 1, wherein the locking wheel (12) includes an annular circumferential layer of one of rubber and plastic material.

* * * * *